US012712656B2

(12) United States Patent
Ambeskar et al.

(10) Patent No.: US 12,712,656 B2
(45) Date of Patent: Aug. 18, 2026

(54) SYSTEM AND METHOD FOR SPECTRAL BANDWIDTH REALLOCATION BASED ON LOAD DETECTION AND/OR PREDICTION IN A DATA COMMUNICATION NETWORK

(71) Applicant: HUGHES NETWORK SYSTEMS, LLC, Germantown, MD (US)

(72) Inventors: Nimesh Ambeskar, Germantown, MD (US); Venkat Ganesan, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 59 days.

(21) Appl. No.: 19/007,028

(22) Filed: Dec. 31, 2024

(65) Prior Publication Data

US 2026/0189317 A1 Jul. 2, 2026

(51) Int. Cl.

*H04J 13/16* (2011.01)
*H04L 5/00* (2006.01)
*H04L 47/125* (2022.01)

(52) U.S. Cl.

CPC ............ *H04J 13/16* (2013.01); *H04L 5/0044* (2013.01); *H04L 47/125* (2013.01); *H04J 2013/165* (2013.01)

(58) Field of Classification Search

CPC ... H04J 13/16; H04J 2013/165; H04L 5/0044; H04L 47/125

See application file for complete search history.

(56) References Cited

U.S. PATENT DOCUMENTS

| | | | | |
|---|---|---|---|---|
| 7,975,008 | B2 * | 7/2011 | Hart | H04B 7/18543 709/224 |
| 8,929,217 | B2 * | 1/2015 | Torres | H04W 72/56 370/310 |
| 9,749,036 | B2 * | 8/2017 | Agarwal | H04B 7/18515 |
| 2004/0008726 | A1 * | 1/2004 | Kelly | H04L 47/822 370/468 |
| 2017/0317943 | A1 | 11/2017 | Xu et al. | |
| 2023/0370159 | A1 | 11/2023 | Border | |

OTHER PUBLICATIONS

International Search Report and Written Opinion issued Apr. 21, 26 in PCT/US2025/060042 (11 pages).

Lee et al., "Scrambled Code Multiple Access waveform for micro satellite terminals", Military Communications Conference, 2012—MILCOM 2012 IEEE, Oct. 29, 2012 (Oct. 29, 2012), pp. 1-6.

* cited by examiner

*Primary Examiner* — Dac V Ha

(74) *Attorney, Agent, or Firm* — NovoTechIP International PLLC

(57) ABSTRACT

A data processing system and method for reallocating inroute channels of a receiver of a data communication system, the receiver being configured to receive communication signals of the data communication system on the inroute channels. The reallocating is performed by detecting an offered load of the communications signals on the inroute channels of the receiver, reallocating Scrambled Code Multiple Access/Asynchronous Scrambled Code Multiple Access (SCMA/ASCMA) channels of the inroute channels to Time Division Multiple Access (TDMA) channels of the inroute channels upon detecting that the offered load is less than a predetermined threshold, and reallocating TDMA channels of the inroute channels to SCMA/ASCMA channels of the inroute channels upon detecting that the offered load is greater than the predetermined threshold.

20 Claims, 9 Drawing Sheets

DATASET AND PRE-PROCESSING

- DATA ORIGIN
  - IGM:
    - OPERATING PROBABILITY
    - AVERAGE DETECTED BURSTS
  - IDC:
    - SLOT LAMBDA
    - SLOT PROBABILITY
    - CHANNEL LAMBDA
    - CHANNEL PROBABILITY
- DATA SIZE AND SCHEMA
  - 54.4 HRS OF DATA/9795 DATA POINTS
- DATA PREPROCESSING
  - PYTHON SCRIPTS ARE USED TO PROCESS THE DATA IN THE REQUIRED FORMAT

| DATE | TIME | OPERATING_PROB | AVERAGE_DETECTED_BURSTS |
|---|---|---|---|
| 6/8/2021 | 14:31:45 | 36.9848 | 1447 |
| 6/8/2021 | 14:32:08 | 44.4493 | 1746 |
| 6/8/2021 | 14:32:31 | 80 | 1607 |
| 6/8/2021 | 14:32:55 | 100 | 1691 |
| 6/8/2021 | 14:33:18 | 93.28 | 1398 |
| 6/8/2021 | 14:33:41 | 100 | 1939 |
| 6/8/2021 | 14:34:04 | 27.913 | 1480 |
| 6/8/2021 | 14:34:27 | 70.4 | 1857 |

TABLE 1. SAMPLE IGM DATA

| SLOT LAMBDA | CHANNEL LAMBDA | USER0_SLOT_PROB | USER0_CHANNEL_PROB |
|---|---|---|---|
| 5.1141 | 3.6776 | 0.014 | 0.0937 |
| 5.1141 | 3.6776 | 0.014 | 0.0937 |
| 5.1141 | 3.6776 | 0.014 | 0.0937 |
| 5.1141 | 3.6776 | 0.014 | 0.0937 |
| 5.1141 | 3.6776 | 0.014 | 0.0937 |
| 5.1141 | 3.6776 | 0.014 | 0.0937 |
| 5.1141 | 3.6776 | 0.014 | 0.0937 |
| 5.1141 | 3.6776 | 0.014 | 0.0937 |

TABLE 2. SAMPLE IDC DATA

FIG.5A

SYSTEM AND METHOD FOR SPECTRAL BANDWIDTH REALLOCATION BASED ON LOAD DETECTION AND/OR PREDICTION IN A DATA COMMUNICATION NETWORK

TECHNICAL FIELD

The present disclosure is related generally to satellite communication systems, and in particular to spectral bandwidth reallocation schemes for RF gateways in satellite communication systems.

BACKGROUND

Modern satellite communication systems provide a robust and reliable infrastructure to distribute data across vast distances, especially in remote areas where traditional networks, such as cable and cellular networks, are unreliable and/or unavailable. Significant time and effort have been spent in trying to find ways to increase the reliability and availability of satellite communication systems. RF gateways include the hardware and software needed to transmit data to and receive data from a satellite. RF gateways are susceptible to outages and performance degradation due to certain environmental factors and weather conditions.

Satellite networks (such as the Jupiter™ 2 network and the Jupiter™ 3 network) can use a random access protocol called Scrambled Code Multiple Access (SCMA) and Asynchronous Scrambled Code Multiple Access (ASCMA) as return channel L1 technology for faster satellite network access. This low latency inroute technology is primarily used for the transport of user data that is classified as expedited data thereby reducing the latency of interactive traffic. Typically, Time Division Multiple Access (TDMA) technology is used for data that has been classified as non-expedited data. As the SCMA/ASCMA technology involves the processing of inroute burst traffic from various users that are overlapped in time at the gateway demodulator of the satellite network, it allows for the implementation of a more efficient pure Aloha protocol replacing the inefficient slotted Aloha protocol on the inroute channels. However, issues can arise in the use of such systems in terms of inefficiencies when the SCMA/ASCMA channels are underutilized and during periods of channel congestion, which adversely affects performance when the SCMA/ASCMA channels are overutilized.

SUMMARY

In one general aspect, the instant disclosure presents a data processing system having a processor and a memory in communication with the processor wherein the memory stores executable instructions that, when executed by the processor alone or in combination with other processors, cause the data processing system to perform multiple functions. The functions may include detecting an offered load of the communications signals on the inroute channels of the receiver, reallocating Scrambled Code Multiple Access/Asynchronous Scrambled Code Multiple Access (SCMA/ASCMA) channels of the inroute channels to Time Division Multiple Access (TDMA) channels of the inroute channels upon detecting that the offered load is less than a predetermined threshold, and reallocating TDMA channels of the inroute channels to SCMA/ASCMA channels of the inroute channels upon detecting that the offered load is greater than the predetermined threshold.

In another general aspect, the instant disclosure presents a method of detecting an offered load of the communications signals on the inroute channels of the receiver, reallocating Scrambled Code Multiple Access/Asynchronous Scrambled Code Multiple Access (SCMA/ASCMA) channels of the inroute channels to Time Division Multiple Access (TDMA) channels of the inroute channels upon detecting that the offered load is less than a predetermined threshold, and reallocating TDMA channels of the inroute channels to SCMA/ASCMA channels of the inroute channels upon detecting that the offered load is greater than the predetermined threshold.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 5A and 5B show datasets and pre-processing and test/training results in accordance with aspects of the disclosure.

DETAILED DESCRIPTION

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Modern satellite communication systems provide a robust and reliable infrastructure to distribute data across vast distances, especially in remote areas where traditional networks, such as cable and cellular networks, are unreliable and/or unavailable. Satellite communication systems have become an essential resource for many applications and services, including television, telephone, radio, internet, and military applications, due to the global connectivity and high data transmission rates provided by these systems. Due to the widespread use and often critical nature of satellite communication services, significant effort has been expended in finding ways to improve reliability, efficiency, and quality of service of satellite communication systems.

One component of a satellite communication system that is crucial in terms of reliability, efficiency, and quality of service of the system is an RF gateway. RF gateways includes the hardware and software needed to transmit data to and receive data from a satellite. Because RF gateways are typically associated with and provide satellite communication services to a large number of satellite terminals (i.e., customer premises equipment (CPEs)) at the same time, the failure of a single RF gateway can adversely impact the services provided to a large number of customers. This is exacerbated by the fact that the frequency bands used for data transmission to and from a satellite are susceptible to degradation/attenuation (e.g., rain fade) due to certain environmental and/or weather-related conditions. Further, although SCMA/ASCMA protocols have recently been used for faster satellite communications, underutilization of SCMA/ASCMA channels can occur at some times of the day, leading to inefficient use of spectrum bandwidth, and congestion of SCMA/ASCMA channels can occur at other times of the day, leading to reduced performance during such periods of congestion.

Figure 1:
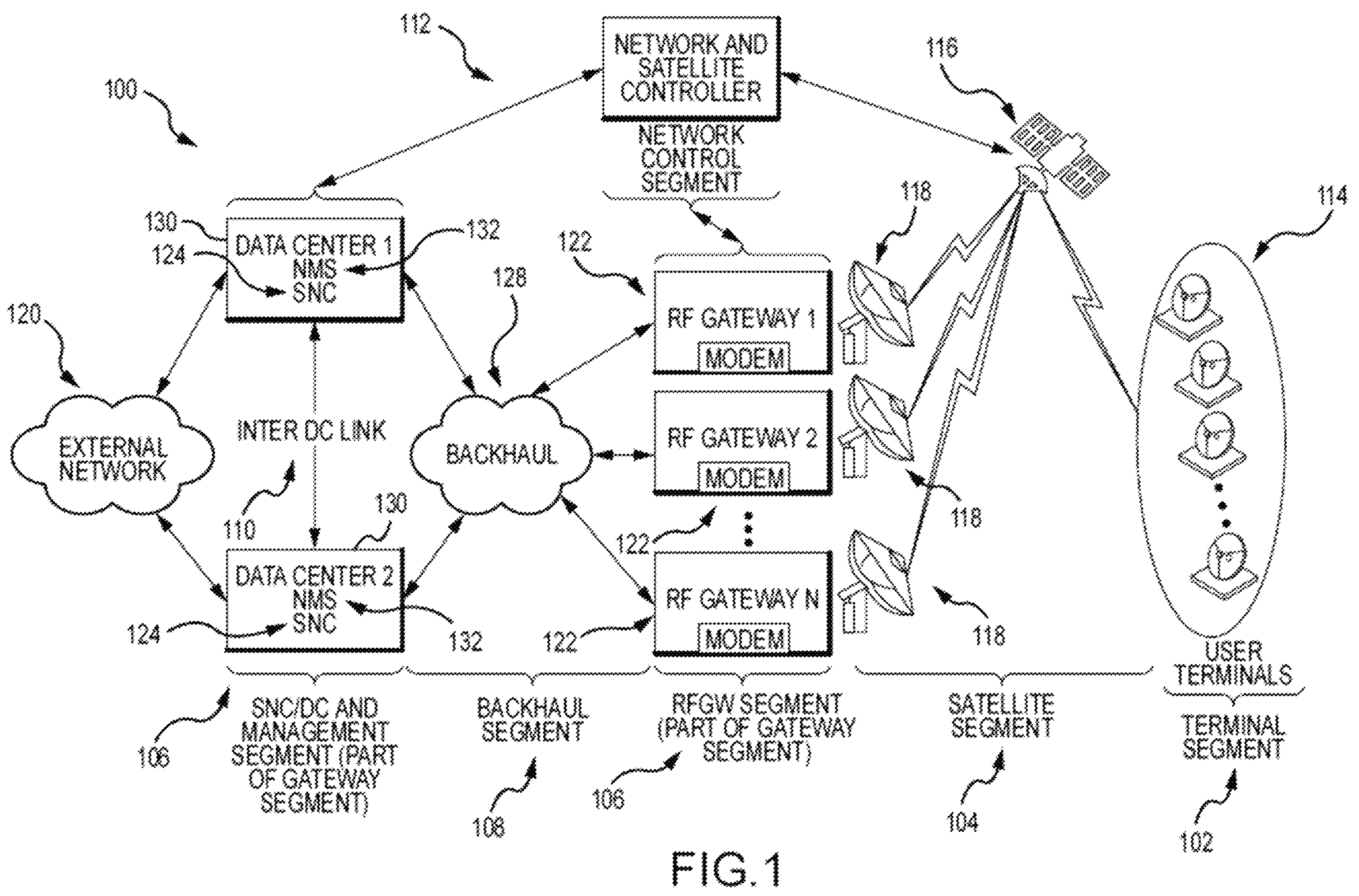
FIG. 1 is a diagram showing an example satellite communication system in which the RF gateway redundancy schemes for the gateway modems disclosed herein may be implemented in accordance with aspects of the disclosure.

FIG. 1 shows an example satellite communication system 100 in which the channel reallocation scheme according to the present disclosure may be implemented. The satellite communication system 100 includes a terminal segment 102, a satellite segment 104, a gateway segment 106, a backhaul segment 108, an inter-DC (data center) or SNC (satellite network core) link segment 110, and a network control segment 112. The terminal segment 102 includes satellite terminals 114 and other components that enable end users to connect to the satellite communication system 100. Satellite terminals 114 may be used at a residence or place of business to provide a user with access to the Internet. Satellite terminals 114 typically include an outdoor unit (ODU) that includes an antenna, such as a satellite dish for receiving RF signals from and transmitting RF signals to a satellite 116, and an indoor unit (IDU), such as a set-top box or similar type of equipment, that includes a transceiver, a controller, memory, local server, and other types of equipment which enable data to be transmitted and received via the ODU. Satellite terminals 114 enable client devices (not shown), such as computers, smart phones, tablets, televisions, and the like, to connect to access the services provided by the satellite communication system 100.

The satellite segment 104 provides connectivity between the terminal segment 102 and the gateway segment 106. The satellite segment 104 includes at least one satellite 116 via which data is transmitted between the satellite terminals 114 and RF components for the gateway segment 106. Satellite 116 may be any suitable type of communications satellite, such as a bent-pipe design geostationary satellite, which is capable of supporting data transmission in one or more frequency bands, such as C, Ku, Ka, Q, V, etc. The satellite segment 104 also includes the radio-frequency terminals (RFTs) and antennas (collectively referred to as RFTs 118) which are located at a gateway site with RF gateway components of the gateway segment 106. Communication between the satellite terminals 114 and the RFTs 118 are established via beams (e.g., spot beams) emitted by the satellite. Communication channels include an outroute channel which includes a forward uplink for transmitting data from a gateway to satellite 116 and a forward downlink for transmitting data from the satellite 116 to a satellite terminal. Communication channels also include an inroute channel which includes a return uplink for transmitting data from satellite terminals 114 to satellite 116 and a return downlink for transmitting data from the satellite 116 to the gateways.

The gateway segment 106 includes devices and components required to interface with the RFTs 118 of the satellite segment 104. The gateway segment 106 also includes network communication components needed to establish connectivity to the external network 120 (e.g., Internet). The gateway segment 106 has two logical components that can be deployed at the same or different sites: (1) RF gateways 122 and (2) Satellite Network Cores (SNCs) 124. An RF gateway 122 includes computing hardware and RF communication components for interfacing with the RFTs 118 and communicating via the satellite 116. RF communication components include at least one modulator and demodulator for converting analog data to digital data and vice versa that is transmitted and/or received to/from a satellite via the RFT. As discussed below, switching out failed primary modems in the RF gateways 122 for spare modems to allow for continued smooth operations can be implemented using the present disclosure. SNCs 124 include hardware and software components for implementing the link layer, network layer, and management layers which enable data communication between RF gateways 122 and the external network(s) 120 via backhaul network 128. In embodiments, SNCs 124 are implemented in data centers 130. A data center corresponds to the physical site or location where SNCs are hosted. For example, SNC 124 is hosted at data center (DC) 130.

The backhaul segment 108 provides connectivity between RF gateways 122 and SNCs 124. The backhaul segment 108 includes networking components and infrastructure components for implementing a backhaul network 128 via which data communications between RF gateways 122 at gateway sites and SNCs 124 at data centers 130 are transmitted. The backhaul network 128 may also be used to provide remote access for network management system components of the network control segment 112. The inter-dc link segment 110 provides connectivity between data centers 130. The inter-dc link segment 110 includes networking components and network infrastructure components that enable secure data communications.

The network control segment (NCS) 112 includes the central and distributed components required to manage the terminal and gateway segment (RFGW and SNC) components. In embodiments, the network control segment includes a network management system (NMS) 132 that provides tools for managing the satellite communication network and the terminals in the network. The NMS 132 may be responsible for managing all aspects of terminals within the system, including provisioning and commissioning of terminals. In embodiments, the NMS 132 may be hosted at one or more data center sites 130.

As noted above, current satellite networks such as shown in FIG. 1 can use SCMA/ASCMA random access protocols as return channel L1 technology for faster satellite network access. The SCMA/ASCMA channel access and utilization can be optimized and controlled to specific user arrival loads at the gateway demodulator that corresponds to the desired physical layer performance. This user arrival load, also known as channel load, is measured in terms of lambda or average user arrival count on SCMA/ASCMA inroute channels in each duration of time. The offered load is the user arrival load if the ASCMA channels were available for transmissions all the time for all the terminals in the network. On consumer networks, the channel load is controlled using a congestion control algorithm, to a desired lambda (L) that corresponds to optimal packet loss performance.

For Jupiter 2™ satellite networks which use SCMA channels, these SCMA channels often operate at a maximum lambda of about 4, which corresponds to a packet loss ratio of 1E-03. Typically, offered load is same or lower than optimal channel load during off peak hours. During peak usage periods and for networks with large number for terminals, the offered load is much higher than the desired channel load also known as congestion. For satellite networks using ASCMA, such as Jupiter 3™, the ASCMA is expected to operate at a lambda higher than 9, which would also correspond to a packet loss ratio of 1E-03. Although the present disclosure can be used with both SCMA and ASCMA protocols, the following description generally refers to the use of the present disclosure with ASCMA protocols for purposes of example since this is coming into more common use.

On consumer satellite networks, the user traffic load is not consistent and varies during the time of day depending on the peak/off-peak hours. As a result, the offered load (which is a measure of user traffic) on an ASCMA channel in terms of lambda varies significantly during the day, and typically is low during off-peak hours and high during on-peak hours. If the offered load (user traffic) is less than the desired operating point of lambda, then the ASCMA channels are effectively underutilized during that period. Underutilization of these ASCMA channels prevents optimal use of channel space and prevents potential utilization of inroute spectrum for TDMA (Time Division Multiple Access) traffic. Similarly, if the offered load on the ASCMA channels is above the desired operating point, congestion may be experienced by users in terms of the opportunity to use the ASCMA channels. This can adversely affect system performance such as web response time.

This disclosure provides a system and method of improved utilization of inroute bandwidth/spectrum by automatically detecting and/or predicting offered load and using Dynamic Inroute Reconfiguration (DIR) to reallocate underutilized SCMA/ASCMA channels to TDMA channels. Similarly, the system and method could be used to predict/detect congestion on SCMA/ASCMA channels and reallocate TDMA channels to SCMA/ASCMA channels dynamically using DIR.

As will be discussed in further detail below, in a predictive model, the proposed system and method for automatically reconfiguring SCMA/ASCMA and TDMA channels can leverage a deep learning (machine learning) time series model to predict future load based on past user traffic patterns. By accurately forecasting future load, this system and method offers several potential benefits, including reallocation of spectrum to SCMA/ASCMA channel space from TDMA channel space if offered load indicates congestion. Additionally, underutilized SCMA/ASCMA channels can be effectively repurposed for TDMA traffic, further enhancing the efficiency of the system and method.

The SCMA/ASCMA protocol system allows for Aloha-like inroute channels for terminals to transmit data in bursts. These data transmissions are on unassigned channels that are open to transmit bursts for all the beam users at all times and with performance equivalent to TDMA-assigned channels. However, these Aloha-like transmissions are unallocated/unassigned data transmissions with transmissions from different users/terminal overlapping randomly in time and arriving simultaneously at the gateway (GW) demodulator 210 shown in FIG. 2. This user arrival on an SCMA/ASCMA channel, also known as channel load, has a random distribution at the gateway demodulator 210 input in time. The performance (e.g., packet loss ratio) of the SCMA/ASCMA is a measure of the average user arrival count received at the gateway in each duration of time, which is also known as the lambda.

Figure 2:
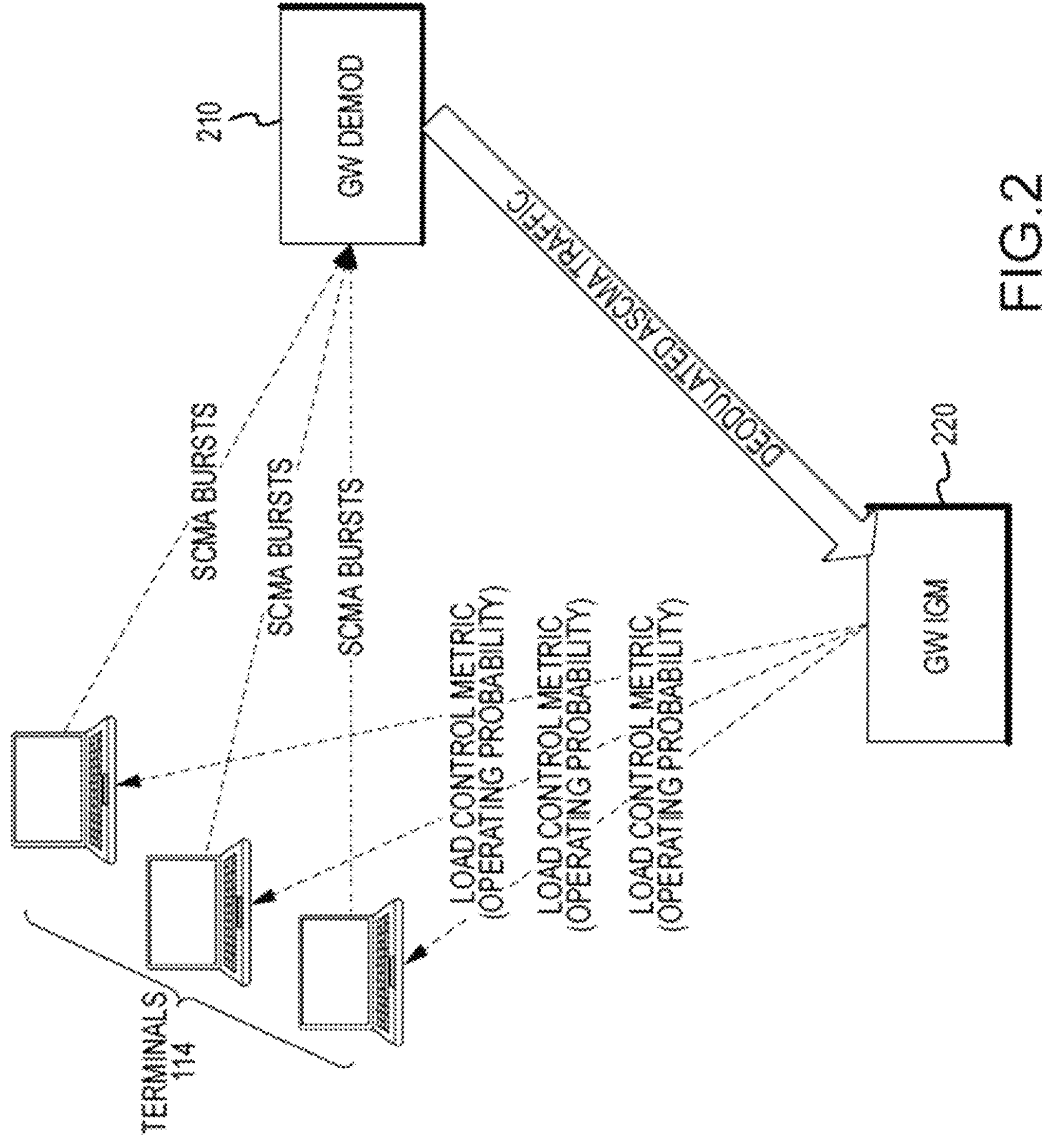
FIG. 2 shows interactions between elements of an RF gateway of FIG. 1 to implement an SCMA/ASCMA congestion control feedback system in accordance with aspects of the disclosure.

FIG. 2 depicts the interaction between various elements of a satellite gateway system to implement a SCMA/ASCMA congestion control feedback system. More specifically, in FIG. 2, a gateway component referred to herein as an Inroute Group Manager (IGM) 220 can implement a load/congestion control algorithm that controls the offered load (user arrival) at the demodulator 210 input to achieve optimal performance. The performance is a measure of Burst Error Rate (BER) and in some current and developing satellite networks, the target is to operate around BER of 1E-03.

The IGM 220 can compute the BER based on the counts of good and bad/error bursts provided by the demodulator 210 in the message headers. If the BER of all the bursts arriving in a fixed given window (e.g., feedback loop duration of 16 frames) exceeds the optimal value (e.g., 1E-03) on an inroute, the IGM 220 suppresses the SCMA/ASCMA channel operation by sending a feedback indicator of operating probability to the terminals 114. The operating probability is an indicator for the terminals 114, and it signifies the percentage of transmit opportunities that can be used on the SCMA/ASCMA channels. As the BER goes above the desired threshold (e.g., 1E-03), the IGM 220 steps down the operating probability (Op) until the BER goes below the desired threshold (e.g., 1E-03). As the BER drops below the desired threshold, the IGM steps up the Op back towards 100%. Thus, the operating probability Op represents ASCMA (or SCMA) congestion at a given time. The operating probability is also a metric that indicates the amount of currently offered user load (OL) in excess of the target user load (TL) in terms of lambda, as shown by the formulas below:

OL=TL+OL (1−Op), where TL is target load for BER>=1E-03 and OL is the offered load.

$$OL = TL/Op$$

Although the system shown in FIG. 2 is helpful for dealing with SCMA/ASCMA congestion, as discussed above, if the offered/incoming channel load is low, then the operating BER is much lower than optimal 1E-03. Hence, SCMA/ASCMA inroute channel spectrum may be underutilized under such scenarios. The following disclosure describes how to better utilize the bandwidth and reallocate the inroute spectrum to other access protocols such as TDMA in such situations where the SCMA/ASCMA inroute channel spectrum is underutilized.

In addition to the issue of underutilized inroute channel spectrum, there could be scenarios of high SCMA/ASCMA demand (for example, during peak hours) with a high offered load to the gateway demodulator 210. During such times, the offered load would be high enough for the BER to be consistently higher than the optimal threshold (e.g., 1E-03), and the congestion control operating probability metric would indicate a value lower than 100%, to control channel load, thus indicating congestion. The lower the operating probability, the higher the congestion, thereby implying a higher offered load. During such times, end users may experience poorer performance to latency-sensitive applications such as Web browsing. In other words, the inroute spectrum may be underutilized during times of low SCMA/ASCMA usage, and, during peak usage times, the SCMA/ASCMA channel allocation may be insufficient to achieve desired user experience for certain applications. The following discussion is directed to improving performance with regard to SCMA/ASCMA systems in both underutilization situations and congestion situations.

Figure 3:
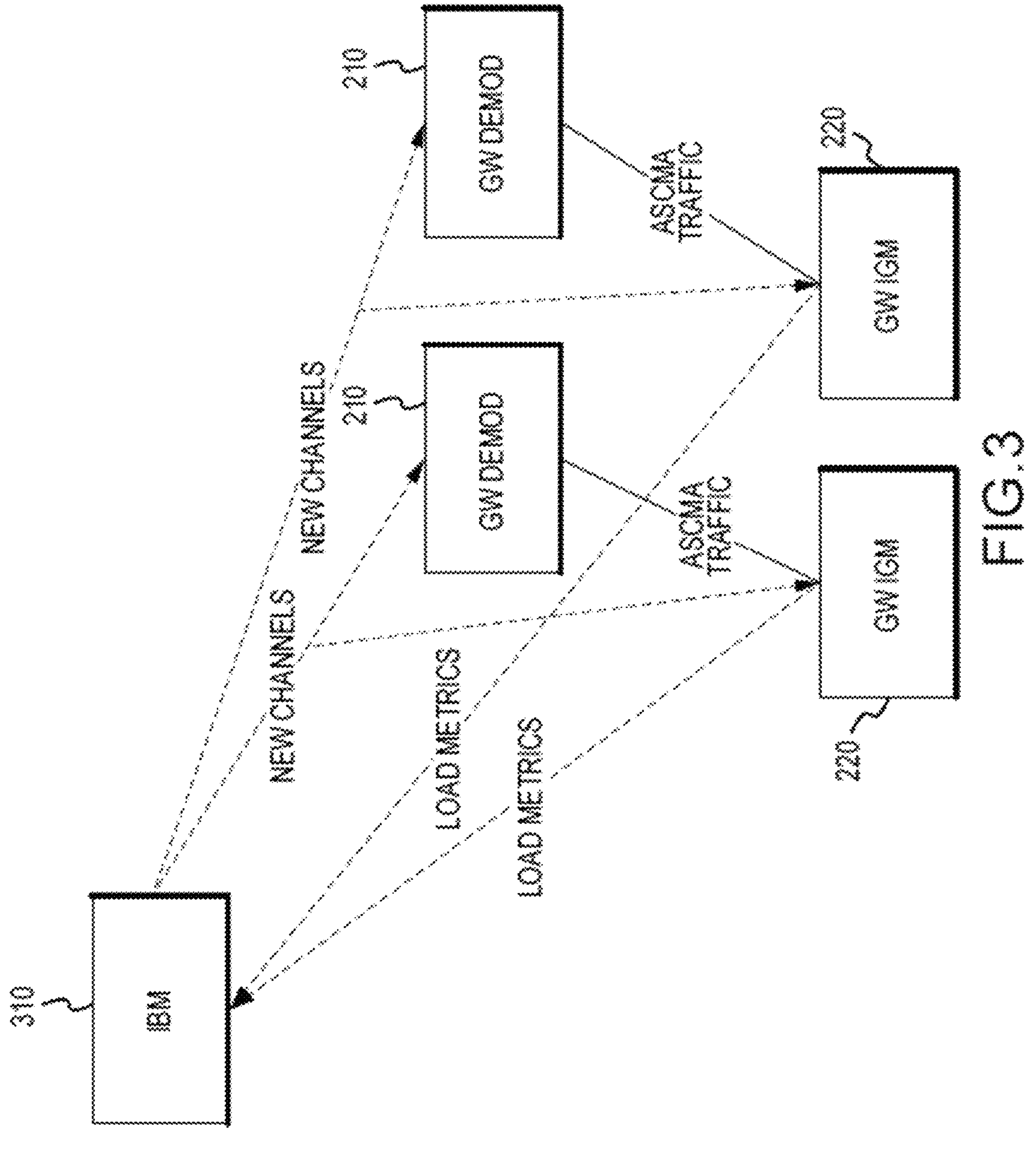
FIG. 3 shows interactions between an inroute bandwidth manager (IBM) and an inroute group manager (IGM) and a demodulator of an RF gateway to reconfigure channels based on detected load in accordance with aspects of the disclosure.
Figure 4:
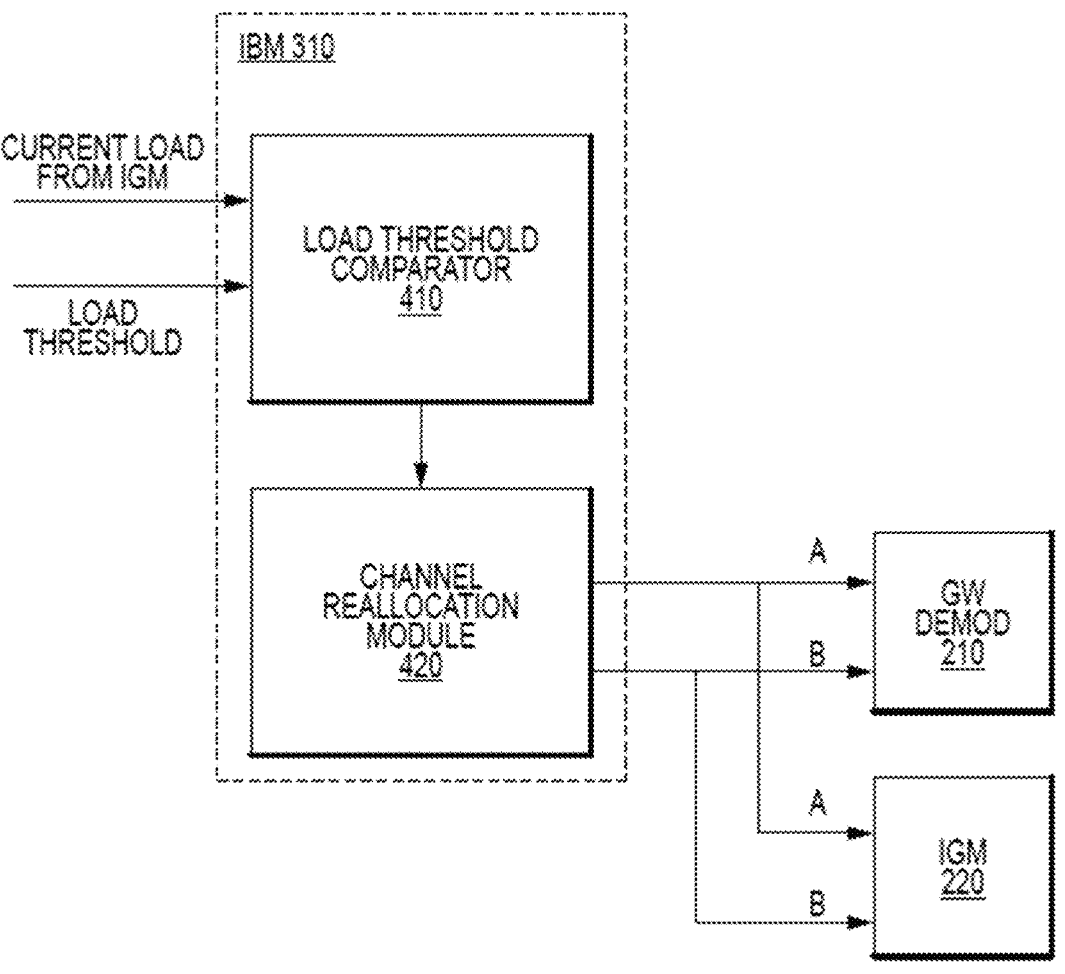
FIG. 4 shows an implementation of the inroute bandwidth manager (IBM) of FIG. 3 in accordance with aspects of the disclosure.

FIGS. 3 and 4 show a system and a method to dynamically reallocate inroute spectrum based on current channel load and/or machine learning (ML) based predictive models using time series prediction for spectrum reallocation. To this end, an inroute bandwidth manager (IBM 310) operates in conjunction with the gateway demodulators 210 and the gateway IGMs 220 to provide this spectrum reallocation by switching between using SCMA/ASCMA channels and TDMA channels based on the current or predicted load, as will be described below. FIG. 3 shows the IBM 310 components to achieve this channel switching.

The first step in the method for reallocating channels based on load is to detect the load. Channel load is a measure of SCMA/ASCMA burst transmissions received in each time-period by the gateway demodulators 210. The demodulators 210 include software, herein referred to as an inroute demodulator controller (IDC), to send burst detection counts periodically to the IGM 220 (In-route Group Manager) as part of the demodulated burst data header. The IGM 220 accumulates the count in a configurable period of time to calculate lambda, as shown below. Typically, an aggregation window used by the IGM 220 is 2 superframes which are congestion control windows.

The following shows calculation of a current load L at the input of a gateway demodulator 210 using lambda:

Sample count window=W superframes.

Arrival observation window (logical)=1 logical segment=3871 symbols=O(w) per superframe.

O(w)=190 (This means that there are 190 logical opportunities for terminals to transmit in a superframe per ASCMA channel).

Total ASCMA burst detections in W superframes frames=N(w).

$$\text{Lambda, } L = N(w)/O(w) * W.$$

For J3 ASCMA, the network may be expected to run at Lambda 9+ for E-03 BER performance with a congestion control window of W=2 superframes.

If N(w)=3500 detections observed in 2 superframes:

$$\text{Current Load } L = 3500/(190 * 2) = 9.2$$

Once the load has been determined in the manner discussed above, the next step is to compare the current load L to a known target load threshold for reconfiguration. For example, if current load L is lower than the target and BER<1E-03 then ASCMA channels are reconfigured to TDMA channels. In other words, if L<TL (target lambda) and BER<target BER, ASCMA channels are removed and TDMA channels are added. In this case, the amount of ASCMA spectrum to convert to TDMA spectrum/channels can be calculated as below:

If the current total ASCMA channels is T, where T is normalized to lowest ASCMA symbol rate as:

$$T = \text{total } ASMCA \text{ capacity/Lowest } ASCMA \text{ symbol rate } (Rs).$$

New total ASCMA channels at lowest symbol rate can be calculated as (N).

New total ASCMA channels N=Old total channels (T)*Current Lambda/Target Lambda.

$$N = T * L/TL \text{ when } L < TL$$

Amount of ASCMA to convert to TDMA in Msps=(T−N)Rs, where Rs is the lowest symbol rate.

$$\text{New } TDMA \text{ capacity} = \text{old } TDMA \text{ capacity} + (T - N) * Rs.$$

In the opposite situation, if the offered load OL is greater than the target, then the TDMA channels are reconfigured to SCMA/ASCMA channels. In other words, if average Operating probability Op is <100% and current measured Load L equals to target Load TL, then the Offered load (OL) would be higher than Target load (TL). In such cases TDMA channels are removed and SCMA/ASCMA channels are added. In an example, the amount of ASCMA spectrum to convert to TDMA spectrum/channels can be calculated as below:

If the current total ASCMA channels is T, where T is normalized to the lowest ASCMA symbol rate as T=total ASMCA capacity/Lowest ASCMA symbol rate (Rs), then the new additional channels at lowest symbol rate (Rs) can be calculated as:

New total ASCMA channels N=Old total channels (T)*Offered Load Lambda (OL)/Target Lambda*(1−average operating probability (Op))

$$N = T * OL/TL$$

$$OL = TL/Op$$

As a result, N can be calculated as: N=T/Op, where Op<100% and measured current lambda L=TL Note Op is the average operating probability over a given duration of time. Therefore, the amount of TDMA to convert to ASCMA in Msps=(N−T)*Rs, where Rs is the lowest ASCMA symbol. As a result, the new ASCMA capacity can be calculated as follows:

$$\text{New } ASCMA \text{ capacity} = N * Rs$$

After the detection of the current load and corresponding action to reduce or increase the ASCMA channels as described above, dynamic inroute reconfiguration (DIR) can be used to reconfigure the gateway demodulator 210 and the IGM 220 with the new channel configuration (e.g., to add the TDMA channels to the inroute channels of the receiver or reallocating the TDMA channels by reducing a number of the TDMA channels and increasing a number of SCMA/ASCMA channels to replace the TDMA channels of the inroute channels). The process of reconfiguring inroute channels using the IBM 310 shown in FIGS. 3 and 4 to control the gateway demodulator 210 and the IGM 220 with the new channel configuration is described in more details below.

A messaging protocol for dynamic inroute reconfiguration can be used to provide the IGM 220 and the IDC (inroute demodulator controller) software in the demodulator 210 with the new channel configurations. First, the IGM 220 detects the load (e.g., calculates the current load) and operating probability Op, as discussed above. The IGM 220 periodically provides these calculations as an input to the IBM 310 for load threshold comparison. The IBM 310 then triggers a channel reconfiguration by providing new channel configuration to both the software IDC in the gateway demodulators 210 and to the IGMs 220 based on the comparison of the current loads with the load thresholds.

More specifically, referring to FIG. 4, the IBM 310 can be configured to include a load threshold comparator 410 and a channel reallocation module 420. The load threshold comparator 410 receives current load calculations from the IGM 220, calculated in the IGM 220 in the manner described above, and a load threshold, along with operating probability, is indicative of a threshold determined as a boundary value between when the SCMA/ASCMA channels are being underutilized and when they are congested. The load threshold comparator 410 then compares the current load with the load threshold and provides an output to the channel reallocation module 420 as to whether the SCMA/ASCMA channels are being underutilized or are congested.

The channel reallocation module 420 uses the comparison results from the load threshold comparator 410 to determine whether the SCMA/ASCMA channels are being underutilized or are congested, as discussed above. The channel reallocation module 420 also uses the comparison results to determine how many of the SCMA/ASCMA channels and the TDMA channels to reallocate, as discussed above, depending on whether underutilization is occurring or channel congestion is occurring. Specifically, when the SCMA/ASCMA channels are congested (because the load threshold is exceeded), the channel reallocation module 420 generates a signal A (shown in FIG. 4) to the gateway demodulator 210 and the IGM 220 to increase SCMA/ASCMA channels by the determined amount and decrease TDMA channels by a corresponding amount. On the other hand, when the SCMA/ASCMA channels are underutilized (because the current load is below the load threshold), the channel reallocation module 420 generates a signal B to the gateway demodulator 210 and the IGM 220 to increase the TDMA channels by the determined amount and decrease SCMA/ASCMA channels by a corresponding amount.

As noted above, a deep learning (machine learning) model could be used to predict channel load in advance based, for example, on time of day. The load prediction can then be used to reconfigure channels based on the prediction of the load at a given time, the load threshold set by the user, and reconfiguration algorithms discussed above. The deep learning could be implemented as a module (not shown) in the IBM 310 that provides predictions of load during various times of day which could then trigger automatic channel reconfigurations as described above.

Figure 5B:
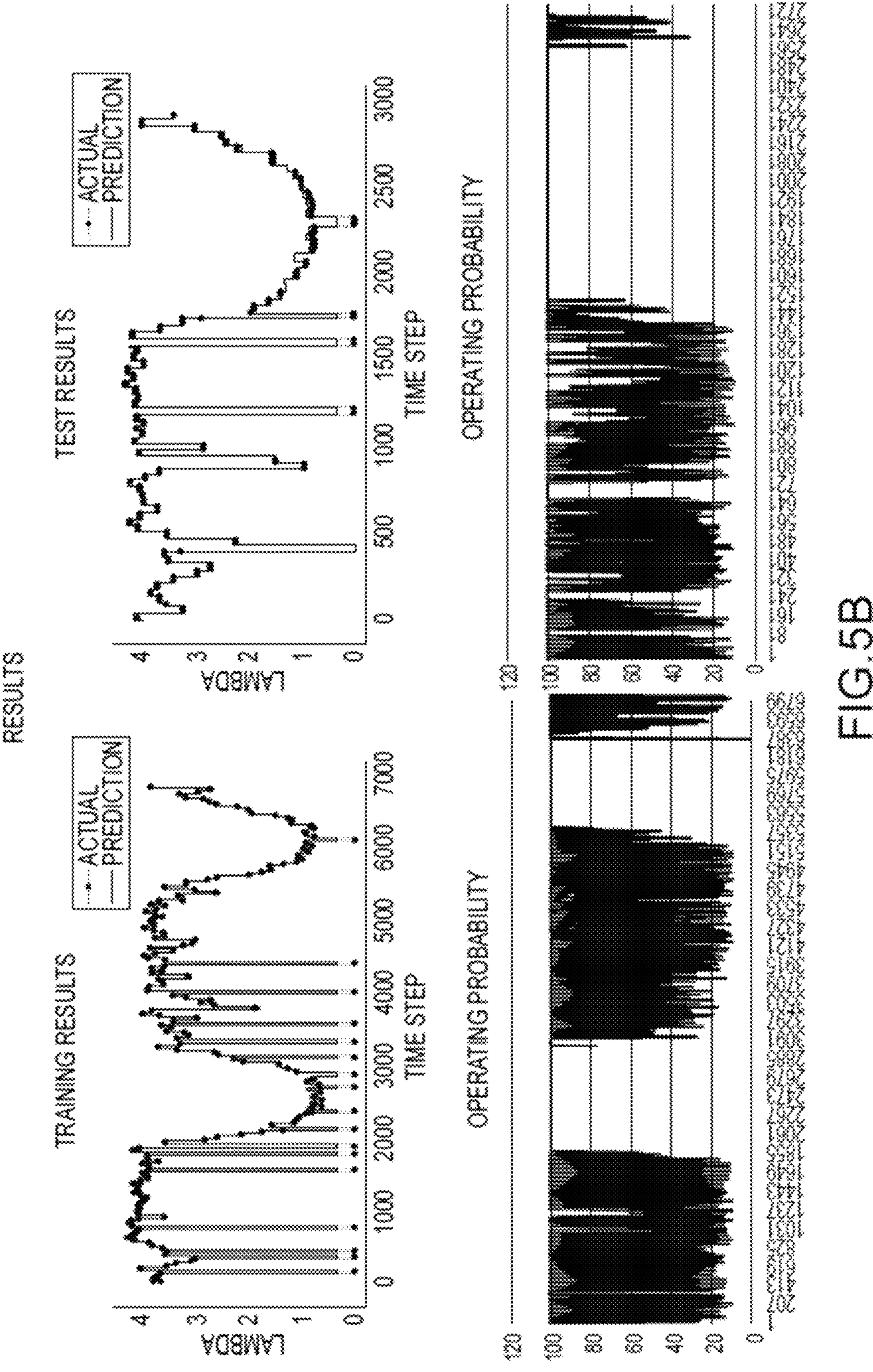

In some implementations, the model is selected based on a current Jupiter™ 2 network using a SCMA data set. In an example, the model is a Long-Short Term Memory (LSTM) and a time series predictive model. FIGS. 5A and 5B show datasets and pre-processing and test/training results in accordance with this prototype.

Referring to FIG. 5A, Table 1 shows sample data from a gateway IGM 220 for operating probabilities Op and average detected bursts at specific times on a given day. Table 2 shows sample IDC data (i.e., data from an inroute demodulator controller in a gateway demodulator 210) regarding slot lambda, channel lambda, user slot probability and user channel probability.

By way of background for FIGS. 5A and 5B, lambda regarding user detected probability follows Poisson distribution. The lambda value depicts the average number of users detected during a time period and helps to analyze system performance having SCMA. An ideal lambda value for the Jupiter™ 2 and 3 systems is 4. A lambda value greater than 4 represents overutilization of the system and less than 4 represents underutilization of the system. To this end, a Long Short-Term Memory (LSTM) model can be used for predicting one data point for lambda using 5 data points. The LSTM model is a recurrent neural network technique.

The following data pre-processing and feature engineering needs to be done before constructing the LSTM model for making the predictions. First, it is necessary to create the dataset, ensuring that all data is float. Next, it is necessary to normalize the features and then split into training and test sets (for example, 70/30). Following this, an array of values can be converted into a dataset matrix, and the MSE loss function and the efficient Adam version of stochastic gradient descent is used. Once these steps are taken, the LSTM model can be used to generate the training results and test results shown in FIG. 5B.

Referring to FIG. 5B, training results for the dataset and pre-preprocessing of FIG. 5A are shown on the left side and test results using the dataset and pre-preprocessing of FIG. 5A are shown on the right side. The training results show actual results and predicted results of lambda as a function of time steps 0-7000 in the upper left graph and operating probabilities as a function of time steps 0-7000 in the lower left graph. The test results show actual and predicted results for lambda as a function of time steps 0-3000 in the upper right graph and operating probabilities as a function of time steps 0-3000 in the lower right graph.

Figure 6:
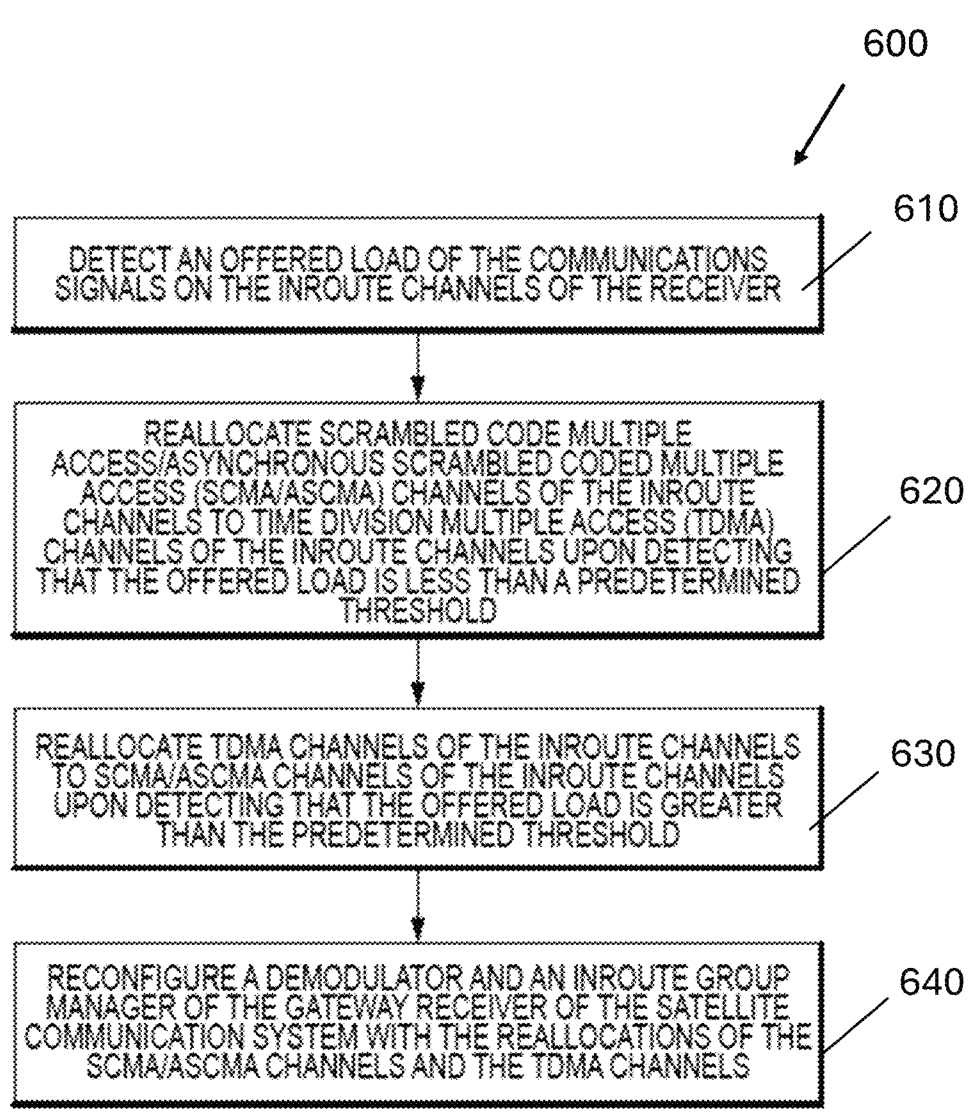
FIG. 6 shows a flowchart of an example method for reallocating channels based on detected load in RF gateway modems in a satellite communication system in accordance with aspects of the disclosure.

FIG. 6 shows a flowchart 600 of an example method for channel reallocation in a satellite communication system in accordance with aspects of the disclosure. Referring to FIG. 6, a first step 610 of the channel reallocation operation is to detect an offered load of the communication signals on the inroute channels of the receiver. Following this, in step 620, reallocation is performed on the scrambled code multiple access/asynchronous scramble code multiple access (SCMA/ASCMA) channels of the inroute channels to time division multiple access ((TDMA) channels of the inroute channels upon detecting that the offered load is less than a predetermined threshold. On the other hand, in step 630, the TDMA channels of the inroute channels are reallocated to SCMA/ASCMA channels of the inroute channels upon detecting that the offered load is greater than the predetermined threshold. Finally, in step 640, a demodulator and an inroute group manager of the gateway receiver of the satellite communication system is reconfigured with the reallocations between the SCMA/ASCMA channels and the TDMA channels.

Figure 7:
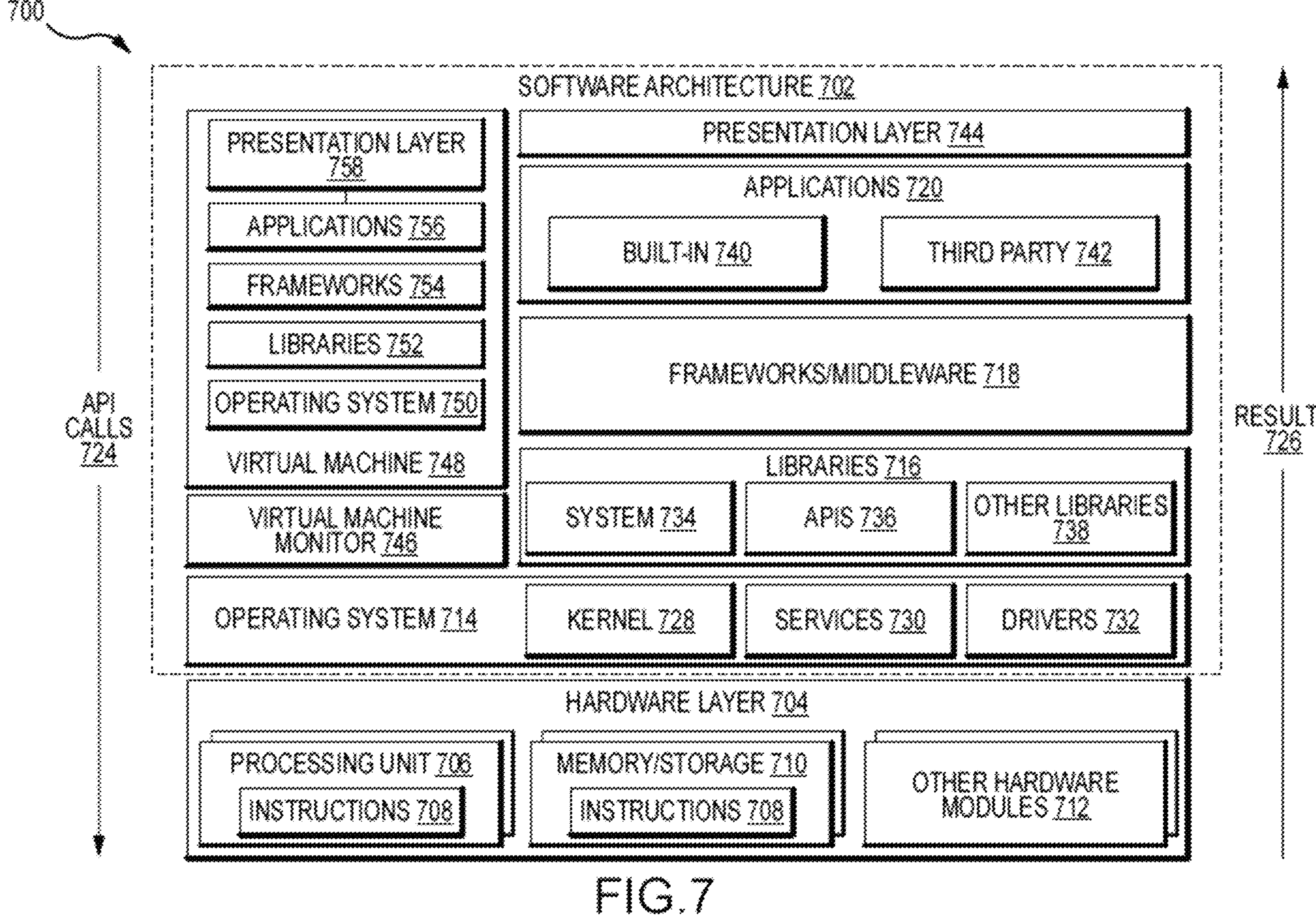
FIG. 7 is a block diagram illustrating an example software architecture, various portions of which may be used in conjunction with various hardware architectures herein described in accordance with aspects of the disclosure.

FIG. 7 is a block diagram 700 illustrating an example software architecture 702, various portions of which may be used in conjunction with various hardware architectures herein described, which may implement any of the above-described features. The gateway IGM 220 and the IBM 310 of FIGS. 2-4 described here are software applications, and can be implemented with the software architecture 702. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, components of the satellite communication system 100 of FIG. 1 and components of the gateway demodulator 210 described herein with regard to FIGS. 2-4. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
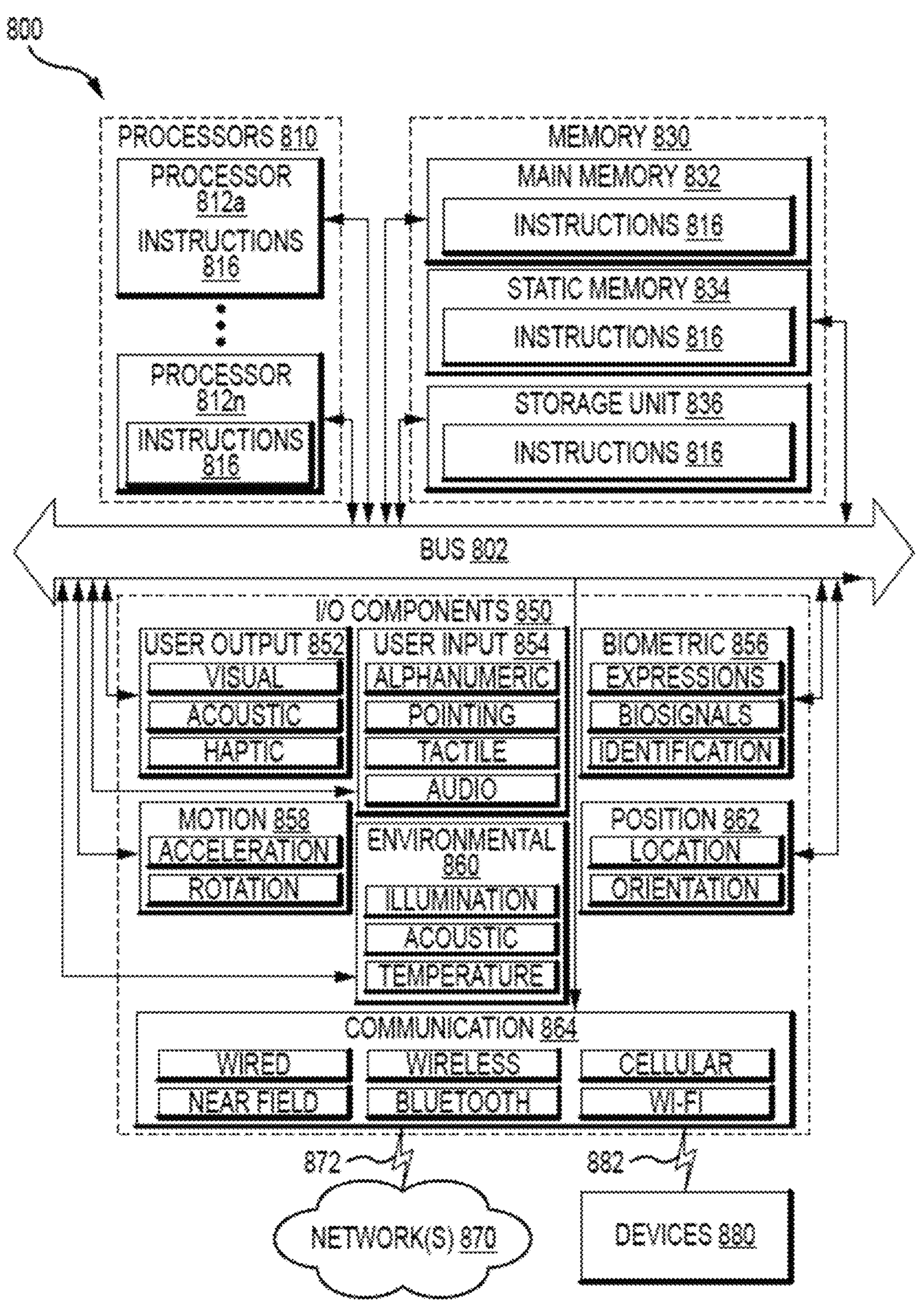
FIG. 8 is a block diagram illustrating components of an example machine configured to read instructions from a machine-readable medium and perform any of the features described herein in accordance with aspects of the disclosure.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), a field programmable gate array (FPGA), an ASIC, or a suitable combination thereof) may include one or more processors 812*a* to 812*n* that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation, as well as RF analog signal processing components, including analog to digital converters.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system for reallocating inroute channels of a receiver of a data communication system, the receiver being configured to receive communication signals of the data communication system on the inroute channels, the data processing system comprising:

a processor; and a memory in communication with the processor, the memory comprising executable instructions that, when executed by the processor alone or in combination with other processors, cause the data processing system to perform functions of:

detecting an offered load of the communications signals on the inroute channels of the receiver;

reallocating Scrambled Code Multiple Access/Asynchronous Scrambled Code Multiple Access (SCMA/ASCMA) channels of the inroute channels to Time Division Multiple Access (TDMA) channels of the inroute channels upon detecting that the offered load is less than a predetermined threshold; and reallocating TDMA channels of the inroute channels to SCMA/ASCMA channels of the inroute channels upon detecting that the offered load is greater than the predetermined threshold.

2. The data processing system of claim 1, wherein:

the data communication system is a satellite communication system;

the receiver is a gateway receiver of the satellite communication system;

the detecting of the offered load is performed by an inroute group manager (IGM) of the gateway receiver; and the reallocating of the SCMA/ASCMA channels and the TDMA channels is performed by an inroute bandwidth manager (IBM) of the gateway receiver.

3. The data processing system of claim 2, further comprising comparing the detected offered load with a known target threshold load before reallocating the SCMA/ASCMA channels and the TDMA channels.

4. The data processing system of claim 3, wherein reallocating the SCMA/ASCMA channels comprises reducing a number of SCMA/ASCMA channels to provide bandwidth to add the TDMA channels to the inroute channels of the receiver.

5. The data processing system of claim 3, wherein reallocating the TDMA channels comprises reducing a number of the TDMA channels and increasing a number of SCMA/ASCMA channels to replace the TDMA channels of the inroute channels.

6. The data processing system of claim 5, further comprising reconfiguring a demodulator of the gateway receiver of the satellite communication system with the reallocations of the SCMA/ASCMA channels and the TDMA channels.

7. The data processing system of claim 6, further comprising reconfiguring the IGM of the gateway receiver of the satellite communication system with the reallocations of the SCMA/ASCMA channels and the TDMA channels.

8. The data processing system of claim 6, wherein the IBM is coupled to the inroute group manager (IGM) of the gateway receiver, and wherein the IGM is configured to implement a load/congestion control algorithm to control the offered load at the demodulator of the receiver of the satellite communication system to optimize performance.

9. The data processing system of claim 1, wherein the reallocating of the SCMA/ASCMA signals and the TDMA signals is performed using a dynamic inroute reconfiguration (DIR).

10. The data processing system of claim 1, wherein detecting of the offered load comprises predicting the offered load using machine learning to predict the offered load in advance.

11. The data processing system of claim 10, wherein the predicting of the offered load comprises predicting the offered load based on a time of day of communication signals being predicted.

12. The data processing system of claim 1, wherein the offered load (OL) is determined by a formula: OL=TL/Op, where TL is target load and Op is operating probability.

13. A method for reallocating inroute channels of a receiver of a data communication system, the receiver being configured to receive communication signals of the data communication system on the inroute channels, the method comprising:

detecting an offered load of the communications signals on the inroute channels of the receiver;

reallocating Scrambled Code Multiple Access/Asynchronous Scrambled Code Multiple Access (SCMA/ASCMA) channels of the inroute channels to Time Division Multiple Access (TDMA) channels of the inroute channels upon detecting that the offered load is less than a predetermined threshold; and reallocating TDMA channels of the inroute channels to SCMA/ASCMA channels of the inroute channels upon detecting that the offered load is greater than the predetermined threshold.

14. The method of claim 13, wherein:

the data communication system is a satellite communication system;

the receiver is a gateway receiver of the satellite communication system;

the detecting of the offered load is performed by an inroute group manager (IGM) of the gateway receiver; and the reallocating of the SCMA/ASCMA channels and the TDMA channels is performed by an inroute bandwidth manager (IBM) of the gateway receiver.

15. The method of claim 14, further comprising comparing the detected offered load with a known target threshold load before reallocating the SCMA/ASCMA channels and the TDMA channels.

16. The method of claim 15, wherein reallocating the SCMA/ASCMA channels comprises reducing a number of SCMA/ASCMA channels to provide bandwidth to add the TDMA channels to the inroute channels of the receiver.

17. The method of claim 15, wherein reallocating the TDMA channels comprises reducing a number of the TDMA channels and increasing a number of SCMA/ASCMA channels to replace the TDMA channels of the inroute channels.

18. The method of claim 14, further comprising at least one of: (1) reconfiguring a demodulator of the gateway receiver of the satellite communication system with the reallocations of the SCMA/ASCMA channels and the TDMA channels; and (2) reconfiguring the IBM of the gateway receiver of the satellite communication system with the reallocations of the SCMA/ASCMA channels and the TDMA channels.

19. The method of claim 13, wherein the reallocating of the SCMA/ASCMA signals and the TDMA signals is performed using a dynamic inroute reconfiguration (DIR).

20. The method of claim 13, wherein detecting of the offered load comprises predicting the offered load using machine learning to predict the offered load in advance, including predicting the offered load based on a time of day of communication signals being predicted, and wherein the offered load (OL) is determined by a formula: OL=TL/Op, where TL is target load and Op is operating probability.

* * * * *